Patented Feb. 13, 1951

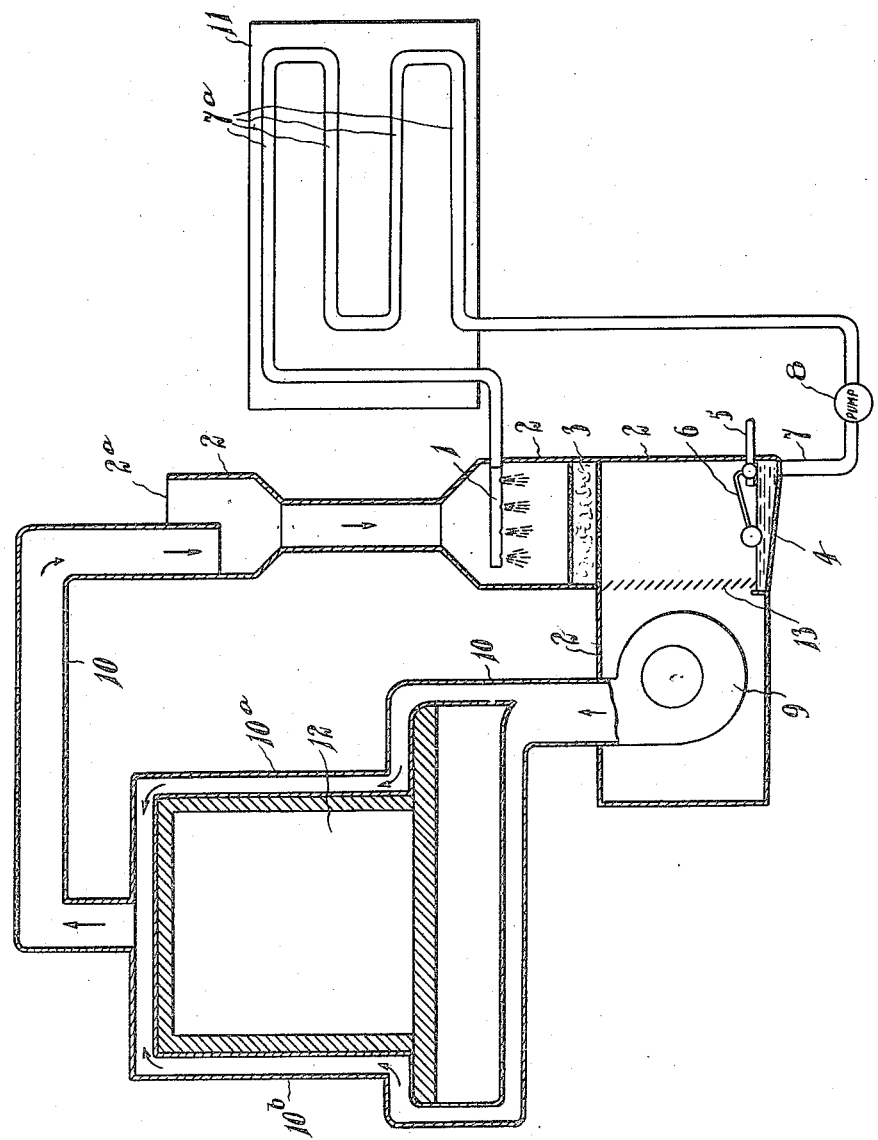

2,541,861

UNITED STATES PATENT OFFICE 2,541,861

PANEL COOLING SYSTEM

Fred W. Chambers, Toronto, Ontario, Canada

Application July 22, 1947, Serial No. 762,598

1 Claim. (Cl. 62—139)

This invention relates to panel cooling, sometimes called radiant cooling, systems. Within recent years the advantages of panel or radiant cooling and heating systems have become more generally recognized which has resulted in wide spread adoption of such systems for heating and cooling buildings. One disadvantage of such systems when used for cooling purposes is the tendency for moisture to become deposited on the interior surfaces of the building adjacent the cooling pipe, duct or conduit by reason of condensation from the atmosphere within the building structure.

Elaborate methods of maintaining the temperature of the panel surface above the dewpoint have been devised. These are expensive, complicated, and not always effective.

The purpose of this invention is to devise a means for ensuring that the temperature of the panel surface will not be reduced below the dewpoint of the atmosphere in the space to be cooled by ensuring that the temperature of the cooling fluid medium will never be below the dewpoint, and this object is obtained, generally speaking, by utilizing evaporative cooling means within a chamber which is open to the atmosphere.

The invention is hereinafter more specifically described and is illustrated by way of example in the enclosed drawing, in which a panel cooling system made in accordance with the present invention is diagrammatically represented.

A spray nozzle 1 is mounted within a spray chamber 2. The spray nozzle 1 is adapted to direct a spray downwardly within the chamber. Preferably an evaporator 3 comprising spun glass wool or similar material between upper and lower screens is mounted within the chamber 2 extending from side to side thereof onto which the liquid from the spray nozzle 1 is deposited and through which said liquid may drip to a sump 4 in the bottom of the air chamber 2. Water is fed through pipe 5 to sump 4 and the level of the watering sump 4 is maintained by means of any suitable conventional float valve 6. A pipe 7 communicates with the bottom of the sump 4 and with spray nozzle 1 providing a circuit for recirculating the water by means of a suitable pump 8, the pipe 5 replacing the water which is lost by evaporation.

Air is circulated in chamber 2 by means of fan 9 which draws air through the usual hole in the fan casing (not shown) from the spray chamber 2 to conduit 10.

Opening 2ª in the spray chamber 2 communicates with the atmosphere. It will be observed that the suction of the fan 9 sucks air in the air chamber through the spray and through the evaporator 3, if such is provided, as a result of which owing to the evaporation of the liquid the sensible heat of the air is converted into latent heat with the result that the dry bulb temperature of both the air and water is reduced. Inasmuch as evaporative cooling systems are well known it is not thought necessary to go into the theory of this phenomenon.

However, the opening 2ª to the atmosphere acts as a vapour vent and vapour pressure equalizer which enables the cooling process to proceed despite the fact that as shown in the drawing both the air and the water is continuously recirculated. The essential purpose of the provision of the opening to the atmosphere is that the temperature of the air and water never falls below the dewpoint of the atmosphere. If the evaporative cooler is operating at one hundred per cent efficiency it will cool the water and the air to the wet bulb temperature of the outside air. If, as usual, operating below one hundred per cent efficiency it will never, in any event, cool the water or the air below the wet bulb temperature of the outside air and at all efficiencies below 100% the dewpoint temperature is lower than the wet bulb temperature. It will therefore be apparent that in a recirculated water system this cooling device is self-regulating.

Either the air or the water may be used for cooling purposes or both. In the drawing the water pipe 7 is shown as arranged in coils 7ª beneath a diagrammatically represented floor 11. The air conduit 10 is shown as split into two sections 10ª and 10ᵇ and carried below the floor and around the walls and over the ceiling of a diagrammatically represented room 12. It will be understood that the water pipe 7 might be returned directly to the spray 1 without being utilized for cooling purposes, or, alternatively, the air conduit 10 might be returned directly to the air chamber 2 without being used for cooling purposes. It will also be understood that if desired the air need not be recirculated but can be ejected to the atmosphere after passing around the walls of the room 12 and a continuous supply of fresh air from the atmosphere drawn in through opening 2ª. Furthermore, if the water is used for cooling, the air can be ejected direct to the atmosphere without being used for cooling purposes and fresh air used in the evaporative cooler.

It may be said that the evaporative cooler itself is of a conventional type. Baffles 13 are provided between the main part of air chamber 2 in which the evaporation takes place and the portion of air chamber 2 in which the fan is located to prevent unabsorbed water from being drawn into the system.

This system is not applicable to ordinary cooling systems in which the air is discharged directly into the space to be cooled because of the fact that the air is substantially saturated and would result in physical discomfort to the occupants of the space and damage to the walls or furniture or machinery within the space. However, in a panel cooling system, where the cooling medium is entirely within a pipe or conduit the high humidity of the cooling medium is not an objection. It will be observed that its efficiency is dependent on the absolute humidity within the space to be cooled being substantially the same as the absolute humidity of the outside atmosphere, which is usually the case. However, if desired, the opening in the air chamber 2 may be connected directly with the atmosphere within the space to be cooled, but this is in general undesirable because of the fact that the opening 2a serves as a vapour vent for highly saturated vapour which can counterflow from the evaporative cooler even against the inflowing air through conduit 10 or from the atmosphere.

It will be understood that in this system a certain amount of fresh air will be drawn into the system through the vent 2a, and that the quantity of this can be regulated by suitable means as may be desired, the general requirement being, for the greatest efficiency, that the vent shall be of no greater size than is required for the purpose intended, namely to provide an opening to the atmosphere to prevent the temperature of the cooling medium from going below the dewpoint. It will also be understood that the vent 2a may be located in any suitable part of the wall of the air chamber 2.

While this invention has been described in some detail it is not to be restricted thereto but is to be construed broadly and limited solely by the scope of the appended claim.

What I claim as my invention is:

A panel cooling system for an enclosed air space, comprising a spray nozzle, a sump, a pipe for conveying water from the sump to the nozzle, a pump for circulating the water in said pipe from the sump to the nozzle, a spray chamber in which the nozzle is mounted and into which the nozzle is adapted to project a spray, a fan for drawing air through a spray chamber to effect evaporative cooling, and a conduit extending from said spray chamber on the pressure side of the fan and returning to said chamber on the suction side of the fan to form a closed circuit radiant cooling system for said air space, said chamber having an opening therein to the atmosphere on the suction side of the fan to prevent the building up of vapour pressure in the chamber above atmospheric vapour pressure and thus ensure that the cooling system will not be evaporatively cooled below the dew-point of the atmosphere.

FRED W. CHAMBERS.

REFERENCES CITED

The following references are of record in the file of this patent:

UNITED STATES PATENTS

| Number | Name | Date |
|---|---|---|
| 2,069,359 | Dudley | Feb. 2, 1937 |
| 2,118,949 | Scott | May 31, 1938 |
| 2,364,220 | Johnson | Dec. 5, 1944 |